United States Patent

Rieck et al.

(10) Patent No.: US 6,700,232 B2
(45) Date of Patent: Mar. 2, 2004

(54) SOLENOID VALVE HAVING A CLAPPER ARMATURE WITH YOKE PINS AT THE END, REMOTE FROM THE SEALING ELEMENT

(75) Inventors: Frank Rieck, Burgdorf (DE); Robert Bast, Barsinghausen (DE); Carsten Fritz, Hannover (DE); Holger Wagner, Hannover (DE); Ralf Hiddessen, Lehrte (DE); Jan-Peter Ossenbrugge, Langenhagen (DE)

(73) Assignee: Nass Magnet GmbH, Hannover (DE)

( * ) Notice: Subject to any disclaimer, the term of this patent is extended or adjusted under 35 U.S.C. 154(b) by 0 days.

(21) Appl. No.: 09/895,558

(22) Filed: Jun. 30, 2001

(65) Prior Publication Data

US 2002/0067100 A1 Jun. 6, 2002

(30) Foreign Application Priority Data

Jul. 13, 2000 (DE) .......................... 100 34 033

(51) Int. Cl.⁷ ..................... H02K 33/00; H02K 35/00; H02K 7/06; H02K 7/00
(52) U.S. Cl. ........................ 310/23; 310/34; 310/30; 310/14
(58) Field of Search ................. 310/34, 30, 23, 310/14

(56) References Cited

U.S. PATENT DOCUMENTS

| | | | | | |
|---|---|---|---|---|---|
| 3,961,644 | A | * | 6/1976 | Eckert | 137/625.65 |
| 4,196,751 | A | * | 4/1980 | Fischer et al. | 137/625.65 |
| 4,840,193 | A | * | 6/1989 | Schiel | 137/627.5 |
| 4,905,743 | A | * | 3/1990 | Gray | 141/198 |
| 5,040,106 | A | * | 8/1991 | Maag | 364/167.01 |
| 5,040,567 | A | * | 8/1991 | Nestler et al. | 137/625.44 |
| 5,048,564 | A | * | 9/1991 | Gaiardo | 137/599.07 |
| 5,083,546 | A | * | 1/1992 | Detweiler et al. | 123/520 |
| 5,158,263 | A | * | 10/1992 | Shimizu et al. | 251/129.21 |
| 5,277,167 | A | * | 1/1994 | DeLand et al. | 123/518 |
| 5,390,703 | A | * | 2/1995 | Tengesdal | 137/629 |
| 5,429,099 | A | * | 7/1995 | DeLand | 123/520 |
| 5,431,302 | A | * | 7/1995 | Tulley et al. | 222/14 |
| 5,454,406 | A | * | 10/1995 | Rejret et al. | 141/1 |
| 5,509,395 | A | * | 4/1996 | Cook | 123/518 |
| 5,603,482 | A | * | 2/1997 | Mott et al. | 251/129.2 |
| 5,628,491 | A | * | 5/1997 | Krone | 251/129.21 |
| 5,791,339 | A | * | 8/1998 | Winter | 128/202.22 |
| 5,797,586 | A | * | 8/1998 | Schulte | 251/129.02 |
| 5,845,824 | A | * | 12/1998 | Weimer et al. | 222/641 |
| 5,884,623 | A | * | 3/1999 | Winter | 128/205.24 |
| 5,970,958 | A | * | 10/1999 | DeLand et al. | 123/520 |
| 6,092,783 | A | * | 7/2000 | Scharnowski et al. | 251/129.07 |
| 6,161,539 | A | * | 12/2000 | Winter | 128/205.24 |
| 6,311,951 | B1 | * | 11/2001 | Samulowitz | 251/129.16 |
| 6,328,279 | B1 | * | 12/2001 | Adkins et al. | 251/129.07 |
| 6,447,273 | B1 | * | 9/2002 | Nishimura et al. | 417/505 |
| 6,449,965 | B1 | * | 9/2002 | Murao et al. | 62/133 |

(List continued on next page.)

FOREIGN PATENT DOCUMENTS

EP 0 872 645 A1 10/1998
JP 2002098253 A * 4/2002 .......... F16K/31/06

*Primary Examiner*—Dang Le
*Assistant Examiner*—Pedro J. Cuevas
(74) *Attorney, Agent, or Firm*—Muramatsu & Associates

(57) ABSTRACT

A solenoid valve achieves high reliability and small size with fine tolerance. The solenoid valve having a valve housing, an electromagnet composed of a coil, a yoke and a clapper armature having at least a first valve seat, and a sealing element which can be actuated by the clapper armature and which co-operates with the first valve seat. The yoke has yoke pins and the clapper armature is magnetically and pivotally connecting with one of the yoke pins at the end thereof that is remote from the sealing element. The clapper armature is guided through the coil.

13 Claims, 3 Drawing Sheets

U.S. PATENT DOCUMENTS

| | | | |
|---|---|---|---|
| 6,450,197 B1 * | 9/2002 | Cardin | 137/595 |
| 6,450,590 B1 * | 9/2002 | Leventhal | 303/119.2 |
| 6,453,930 B1 * | 9/2002 | Linkner et al. | 137/15.18 |
| 6,454,548 B2 * | 9/2002 | Falk et al. | 417/417 |
| 6,484,998 B1 * | 11/2002 | Schaffer | 251/65 |
| 6,511,297 B2 * | 1/2003 | Ota et al. | 417/222.2 |
| 6,572,074 B2 * | 6/2003 | Yang et al. | 251/54 |
| 6,575,385 B1 * | 6/2003 | Stier | 239/102.2 |
| 6,592,095 B2 * | 7/2003 | Kabasin et al. | 251/64 |
| 6,612,338 B2 * | 9/2003 | Weldon et al. | 137/630.19 |

* cited by examiner

SOLENOID VALVE HAVING A CLAPPER ARMATURE WITH YOKE PINS AT THE END, REMOTE FROM THE SEALING ELEMENT

FIELD OF THE INVENTION

The invention relates to a solenoid valve having a clapper armature, yoke and yoke pins coupled to the clapper armature, which is capable of high reliability and small size.

BACKGROUND OF THE INVENTION

Solenoid valves are used for control systems of all types and generally comprise a valve housing, an electromagnet, which has a coil, a yoke and an armature, and at least one valve seat and a sealing element which can be actuated by the armature and which co-operates with the valve seat. A particular distinction is drawn between the principle of plunger-type armatures and clapper-type armatures in the configuration of the electromagnet, in particular with regard to the armature.

In order to be able to ensure reliable operation of magnetic valves with power consumption which is as low as possible, fine tolerances must be complied with or compensated for when the individual elements are manufactured and when the solenoid valve is assembled.

There is the additional desire in the field of pneumatics to have smaller and smaller valves. The result in small solenoid valves, even with very fine tolerances, is that a reliable function cannot always be ensured with low power levels and small stroke actions owing to the sum of the individual tolerances.

SUMMARY OF THE INVENTION

Therefore, the problem addressed by the invention is further to develop the solenoid valve so that a reliable function can likewise be ensured with small solenoid valves.

The solenoid valve according to the invention substantially comprises the following components: a valve housing, an electromagnet having a coil, a yoke and a clapper armature, at least a first valve seat and a sealing element which can be actuated by the clapper armature and which co-operates with the first valve seat. The yoke has yoke pins and the armature is arranged on a yoke pin at the end thereof that is remote from the sealing element.

Since the clapper armature is arranged directly on the yoke pin, an additional bearing which causes further tolerance considerations is no longer necessary.

Since the clapper armature is in permanent contact with the yoke pin in the region of the bearing thereof, the magnetic contact resistance can further be kept at a low level.

Furthermore, the armature cannot change its position in translation owing to a suitable arrangement, for example, a shell-like arrangement, of the clapper armature on the yoke pin. In addition, the direct magnetic flux between the yoke pins and the armature ensures a very compact unit in constructional terms.

In order to prevent damage to the coil by the fluid, the coil is generally separated from the fluid region, as is also the case, for example, in EP-A-0 872 675. The separation is effected between the coil and the valve housing so that it is necessary to connect the two components with sealing means. However, that has the disadvantage that the tolerances which occur as a result have to be compensated for. The coil is usually separated from the fluid region by seals, the coil and valve housing optionally being in the form of separate components.

In a preferred embodiment of the present invention, the valve housing is formed in one piece and, at the same time, forms the coil element so that the coil is wound directly onto the valve housing.

The clapper armature is accordingly located directly in the fluid region. The yoke pins each have, on both sides, a surrounding projection (pine tree profile) which presses sealingly into the valve housing when the yoke pins are pressed in. The interior is reliably sealed with the clapper armature owing to a suitable press-fit between the yoke pins and the valve housing without any need for separate seals.

Since no separation is provided between the coil and the valve housing in that embodiment, there are also no additional tolerances at that point.

In another embodiment of the invention, the clapper armature projects beyond the second yoke pin with the end thereof that co-operates with the sealing element. Owing to a construction of that type, there is produced at the valve seat a working stroke which is greater than the stroke at the working air gap in the magnetic circuit. The force available is also increased as a result at the valve seat relative to a conventional construction, in particular when the principle of the plunger-type armature is used, wherein the stroke at the working air gap in the magnetic circuit corresponds to the stroke at the valve seat. The larger force with a smaller stroke in the magnetic circuit is produced by the increase in the force curve with decreasing distance, as a result of which the mean force becomes greater relative to the plunger-type armature solution.

Further advantages and embodiments of the invention are explained below in greater detail with reference to the description of an embodiment and the drawings.

DETAILED DESCRIPTION OF THE INVENTION

Figure 1:
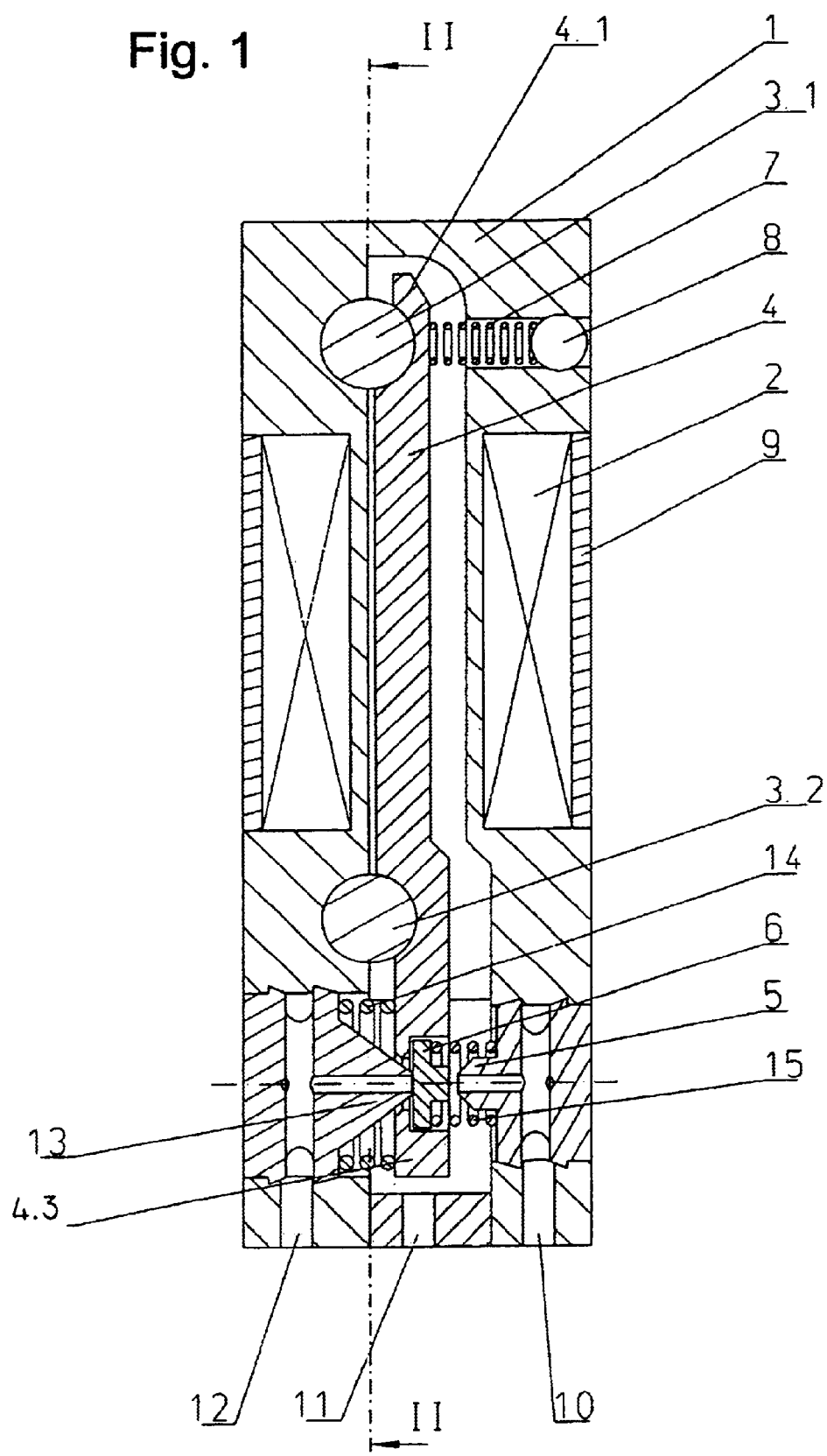
FIG. 1 is a longitudinal sectional illustration of the solenoid valve according to the line I—I of FIG. 2.
Figure 2:
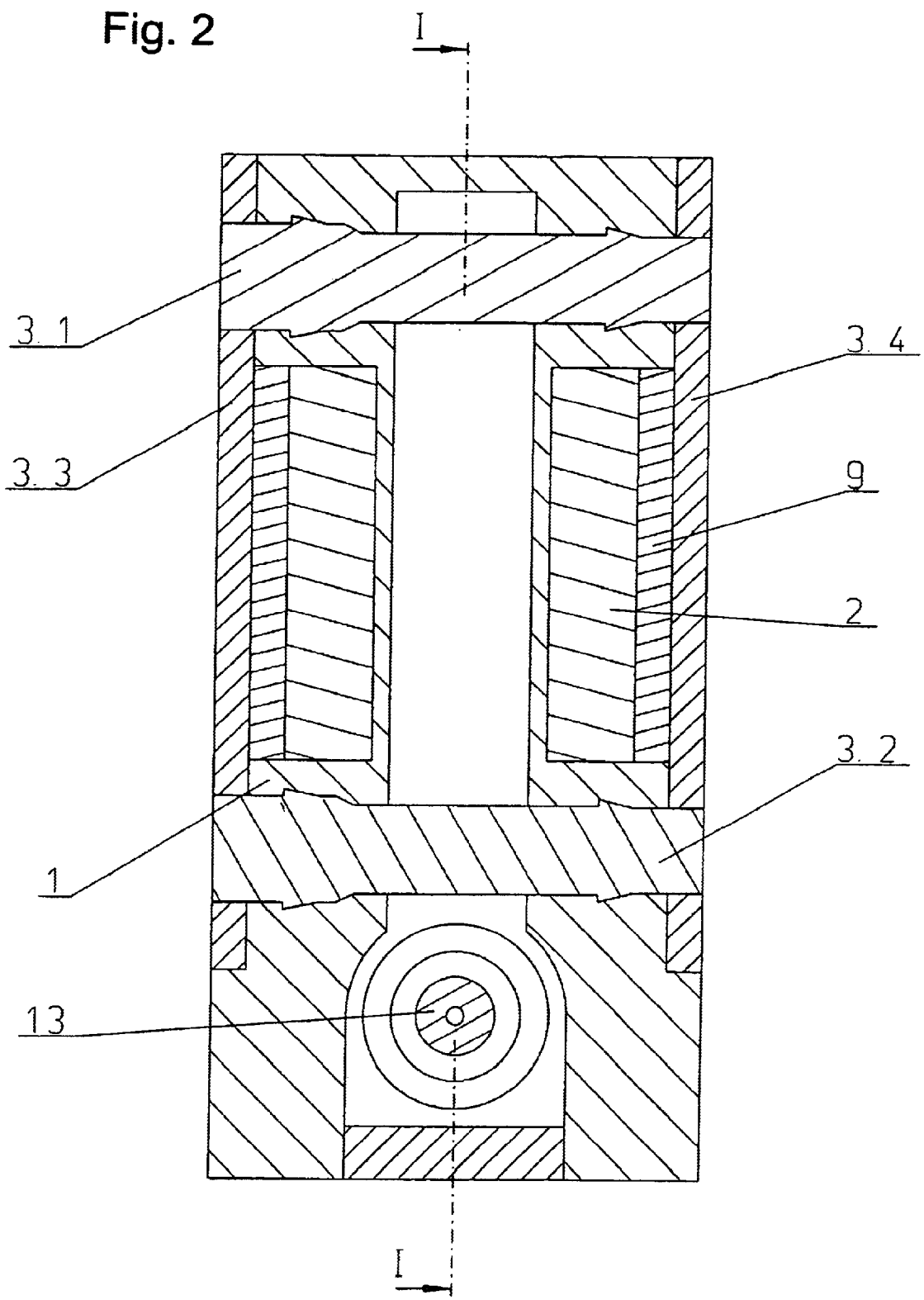
FIG. 2 is a longitudinal sectional illustration of the solenoid valve along the line II—II of FIG. 1.
Figure 3:
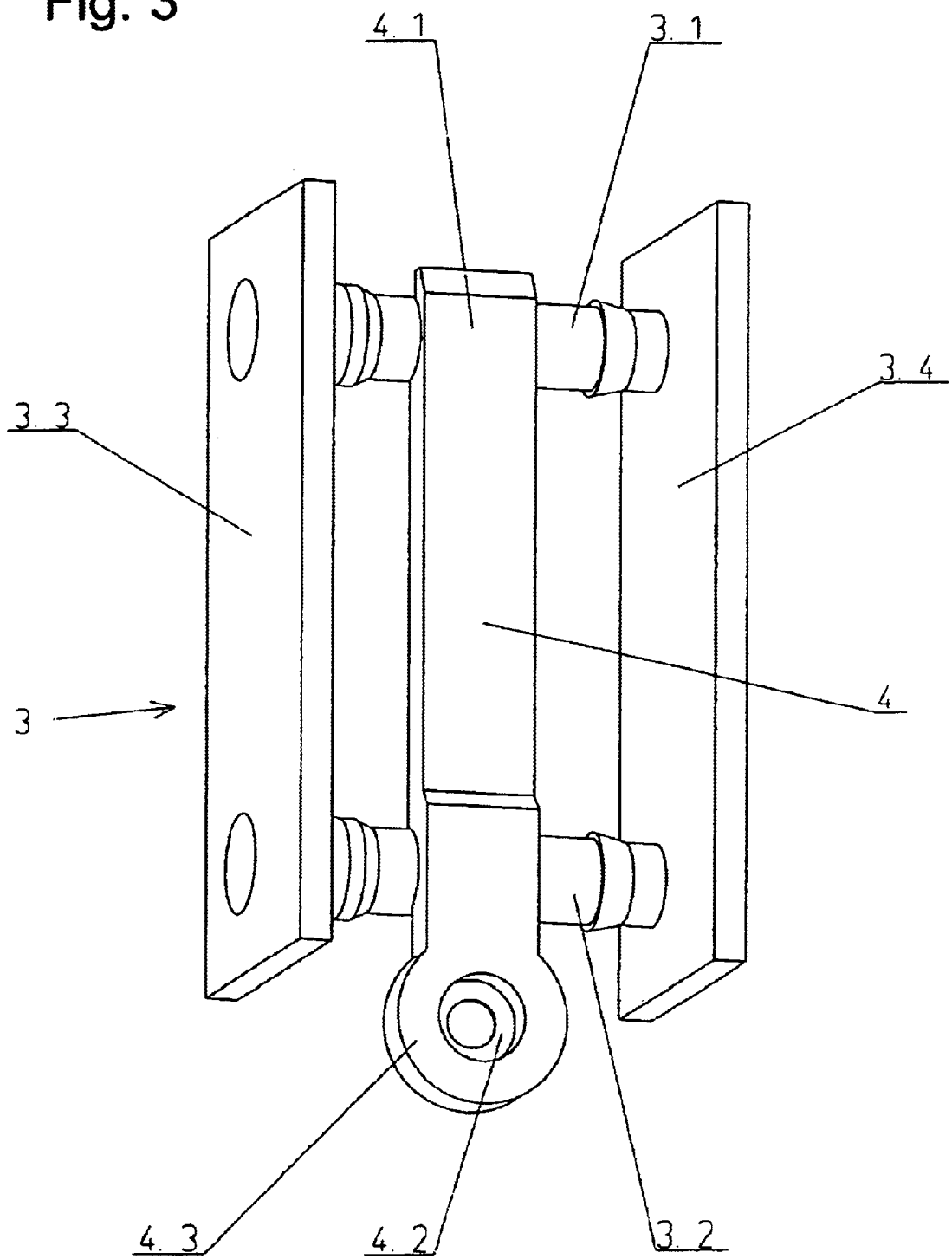
FIG. 3 is a three-dimensional depiction of the yoke and clapper armature.

The solenoid valve which is illustrated in the drawings by way of different views substantially comprises a valve housing 1, an electromagnet, which has a coil 2, a yoke 3 and a clapper armature 4, at least a first valve seat 5, and a sealing element 6 which can be actuated by the clapper armature and which co-operates with the first valve seat.

The yoke 3 has yoke pins 3.1, 3.2, the yoke pins being connected to each other by means of yoke plates 3.3 and 3.4. The clapper armature 4 is guided through the coil 2 and arranged on the yoke pin 3.1 at the end 4.1 thereof that is remote from the sealing element 6. The clapper armature 4 is of shell-like form in the region of the arrangement thereof on the yoke pin, as is particularly apparent from FIG. 1. A spring 7 presses the end 4.1 of the clapper armature 4 permanently onto the yoke pin 3.1 so that the clapper armature is magnetically contacting the yoke and thus, magnetic contact resistance is kept at a low level. Further, because of the shell-like form, the end 4.1 of the clapper armature 4 is pivotally on the yoke pin 3.1.

The spring 7 is supported on a ball 8 which is pressed into the valve housing 1.

The valve housing 1 is preferably formed in one piece. In the embodiment illustrated, the coil 2 is further wound directly onto the valve housing. The coil 2 is surrounded externally by a protective sheath 9.

The clapper armature 4 is in the form of a flat element which is slightly bent over in the region of the yoke pin 3.2 in the embodiment illustrated.

The embodiment illustrated is a 3/2-way solenoid valve having a pressure connection 10, a working connection 11 and a discharge connection 12. Furthermore, a second valve seat 13 is provided in addition to the first valve seat 5, the sealing element 6 being arranged between the two valve seats in a recess 4.2 of the clapper armature 4. The working connection 11 is connected, depending on the position of the sealing element 6, to the pressure connection 10 via the first valve seat 5 or to the discharge connection 12 via the second valve seat 13.

A first resilient element 14 is provided in the region of the end 4.3 of the clapper armature 4 that is opposite the bearing and acts by means of the end 4.2 of the clapper armature on the sealing element 6 for the purpose of a closure of the first valve seat 5 by the sealing element 6. In the closed position (not illustrated) of the first valve seat 5, the clapper armature 4 is lifted away from the yoke pin 3.2. Furthermore, a second resilient element 15 is provided and acts on the sealing element 6 for the purpose of a raising of the sealing element from the first valve seat 5 and, consequently, counter to the first resilient element 14.

However, the first resilient element 14 is stronger than the second resilient element 15 so that, when the electromagnet is not excited, the sealing element 6 remains in closing contact with the first valve seat 5 owing to the greater effect of the first resilient element 14. In that position, a working air gap is formed between the clapper armature 4 and the yoke pin 3.2.

If the electromagnet is excited, that is to say, after a voltage has been applied to the coil 2, the clapper armature 4 is drawn towards the yoke pin 3.2 and counteracts the effect of the first resilient element 14 on the sealing element 6. The sealing element 6 is then lifted by the second resilient element 15 away from the first valve seat 5 and pressed against the second valve seat 13. As soon as the electromagnet is no longer excited, the clapper armature 4 hinges away from the yoke pin 3.2 owing to the effect of the first resilient element 14 so that the sealing element is lifted away from the second valve seat 13 and is moved into closing contact with the first valve seat 5. As seen from the foregoing operation, one of the roles of the yoke pin 3.2 is to accurately positioning the end 4.3 of the clapper armature 4.

Although the second resilient element 15 is not absolutely necessary for the movement of the sealing element 6 between the two valve seats 5, 13, the following advantage is produced:

If the second resilient element 15 were not present, the sealing element 6 would have to be fixed to the clapper armature and would be held on the second valve seat 13 by the clapper armature alone. In that position, however, the working air gap would inevitably be smallest and, consequently, the force of the clapper armature greatest in the region of the sealing element. That would mean that the valve would have to be adjusted extremely precisely in order to prevent either leaks or an excessively large pressure from the sealing element on the second valve seat. In the embodiment illustrated, the closing force of the sealing element on the second valve seat 13 is effected only by the force of the second resilient element 15 since the clapper armature 4 still "hinges inwards" slightly further after the sealing element 6 has come into closing contact with the second valve seat 13. The sealing element 6 is, therefore, also arranged only loosely in the recess 4.2 of the clapper armature 4 for that purpose.

In an arrangement of that type, the sealing element is held by resilient force both in the closed position with the first valve seat and in the closed position with the second valve seat. In that manner, a very reliable operation is ensured without having to comply with excessively fine tolerances.

Therefore, the above-described solenoid valve is also particularly suitable for very small valves.

In order to be able to carry out switching with as little power as possible precisely in very small solenoid valves, it is necessary to comply with fine tolerances. In order to simplify the production and assembly in that respect, not only the yoke pins are pressed into the valve housing, but also the two valve seats, the relative location of the valve seats to each other and to the clapper armature being adjustable by pressing in the valve seats. To that end, the valve seats have an outer surrounding projection which is sealingly pressed into the valve housing when the valve seat is pressed in. In that manner, an extremely compact solenoid valve is obtained and it is possible to dispense with additional seals.

What is claimed is:

1. A solenoid valve comprising:
   a valve housing;
   an electromagnet comprised of a coil wound around an outer surface of the valve housing, a yoke, and a clapper armature having at least a first valve seat; and
   a sealing element which can be actuated by the clapper armature and which co-operates with the first valve seat;
   wherein the yoke has yoke pins and the clapper armature is pivotally and magnetically connected with one of the yoke pins at one end thereof that is remote from the sealing element while another yoke pin engages with another end of the clapper armature that is proximal to the sealing element, and wherein the clapper armature is guided through the coil.

2. A solenoid valve according to claim 1, wherein the valve housing is formed in one piece.

3. A solenoid valve according to claim 1, wherein the coil is wound directly onto the valve housing.

4. A solenoid valve according to claim 1, wherein the clapper armature is arranged in the fluid region.

5. A solenoid valve according to claim 1, wherein the clapper armature is of shell-like form in the region of the arrangement thereof on the yoke pin.

6. A solenoid valve according to claim 1, wherein the clapper armature is pressed onto the yoke pin by means of a spring.

7. A solenoid valve according to claim 1, wherein the first valve seat is pressed into the valve housing and, to compensate for manufacturing tolerances, the first valve seat is adjustable in terms of relative position thereof to the clapper armature by pressing in the valve seat.

8. A solenoid valve according to claim 1, wherein a first resilient element is provided and acts on the sealing element for closing the first valve seat by the sealing element.

9. A solenoid valve according to claim 1, wherein a second resilient element is provided and acts on the sealing element, which co-operates with the clapper armature, for raising the sealing element from the first valve seat.

10. A solenoid valve according to claim 1, wherein a first resilient element is provided and acts on the sealing element for closing the first valve seat by the sealing element, the first resilient element and the electromagnet co-operating in such a manner that, when the electromagnet is excited, the sealing element is lifted away from the first valve seat and, when the electromagnet is not excited, the sealing element comes into closing contact with the first valve seat owing to the force of the first resilient element.

11. A solenoid valve according to claim 1, wherein a second valve seat is provided and co-operates with the sealing element which can be actuated by the clapper armature.

12. A solenoid valve according to claim 1, wherein two valve seats which are pressed into the valve housing are provided, the sealing element which can be actuated by the clapper armature being arranged between the two valve seats and the relative position of the valve seats to each other and to the clapper armature being adjustable by pressing in the valve seats.

13. A solenoid valve according to claim 1, wherein a first resilient element is provided and acts on the sealing element for closing the first valve seat by the sealing element, the first resilient element and the electromagnet co-operate in such a manner that, when the electromagnet is excited, the sealing element is lifted away from the first valve seat and, when the electromagnet is not excited, the sealing element comes into closing contact with the first valve seat owing to force of the first resilient element, a second valve seat is provided and co-operates with the sealing element which can be actuated by the clapper armature, and the first and the second resilient element and the electromagnet co-operate in such a manner that, when the electromagnet is excited, the force of the first resilient element is counteracted by the clapper armature and the sealing element is moved into closing contact with the second valve seat owing to force of the second resilient element and, when the electromagnet is not excited, the sealing element comes into closing contact with the first valve seat owing to the force of the first resilient element.

* * * * *